United States Patent [19]

Daugherty

[11] Patent Number: 4,503,757

[45] Date of Patent: Mar. 12, 1985

[54] BEVERAGE BREWING APPARATUS

[75] Inventor: Donald L. Daugherty, Sherman, Ill.

[73] Assignee: Bunn-O-Matic Corporation, Springfield, Ill.

[21] Appl. No.: 570,817

[22] Filed: Jan. 16, 1984

[51] Int. Cl.³ ............................................. A47J 31/00
[52] U.S. Cl. ...................................... 99/281; 99/295; 219/297
[58] Field of Search ................ 99/279, 280, 281, 282, 99/283, 288, 290, 295, 300, 304, 307; 219/297, 310, 311, 312; 426/433

[56] References Cited

U.S. PATENT DOCUMENTS

| | | | |
|---|---|---|---|
| 3,336,856 | 8/1967 | Martin | 99/288 |
| 3,523,178 | 8/1970 | Spensley | 219/297 |
| 3,736,155 | 5/1973 | Martin | 99/282 |
| 3,978,778 | 9/1976 | Roberts | 99/281 |
| 4,222,320 | 9/1980 | Castleberry | 99/281 |

*Primary Examiner*—Robert W. Jenkins
*Attorney, Agent, or Firm*—Lockwood, Alex, FitzGibbon & Cummings

[57] ABSTRACT

Electrically energized coffee or tea brewing machine of the type including a hot water reservoir and from which the reservoir and its associated components can be readily removed as a unit for servicing by removing the housing cover and then making easy mechanical and electrical disconnections.

4 Claims, 6 Drawing Figures

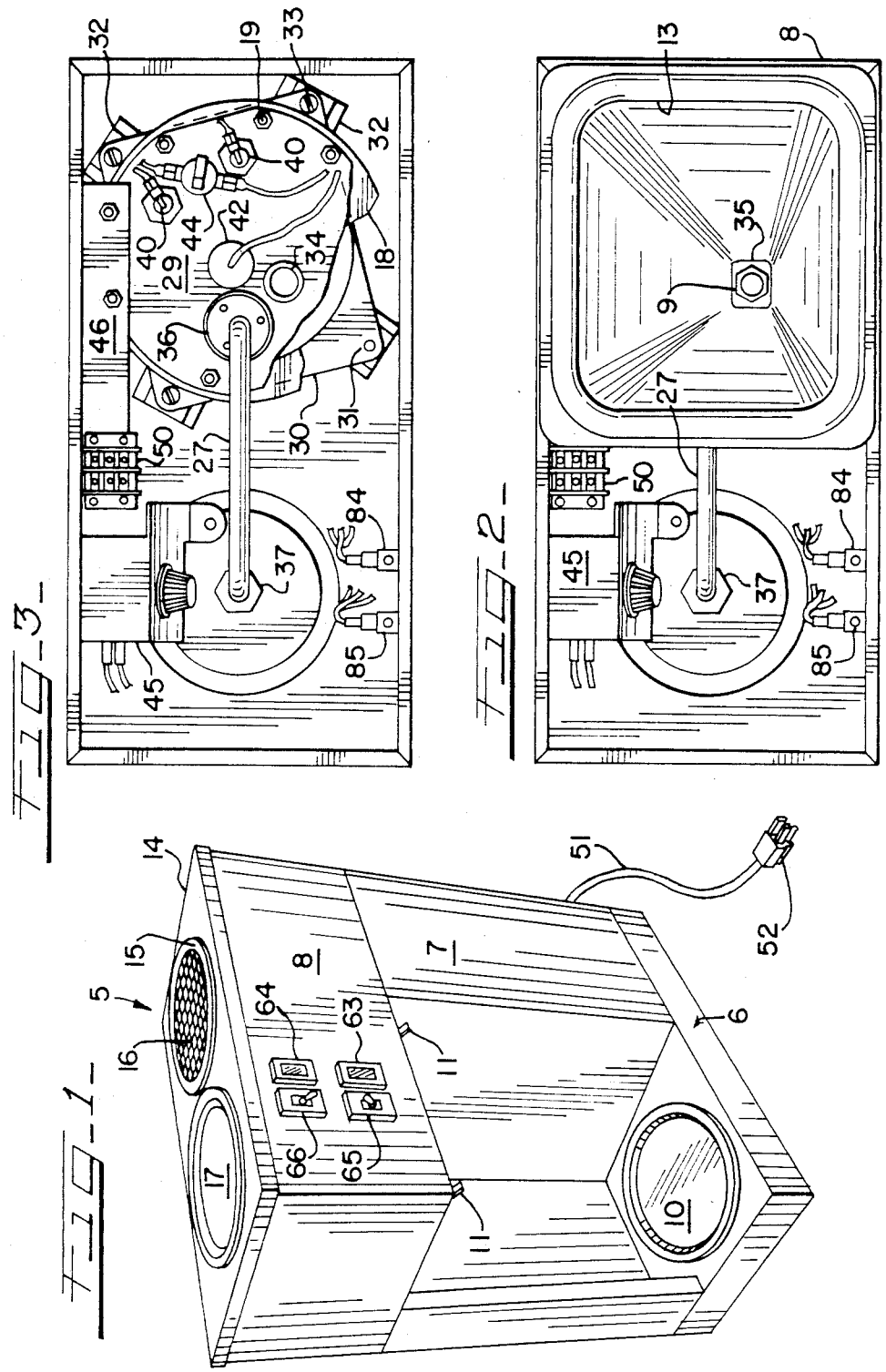

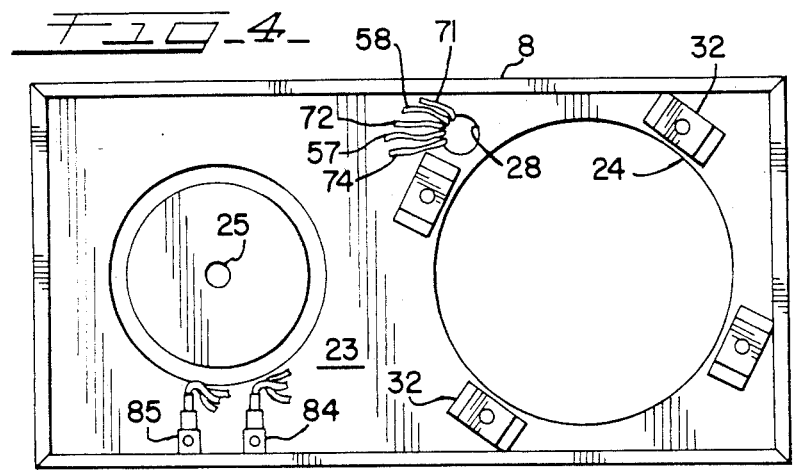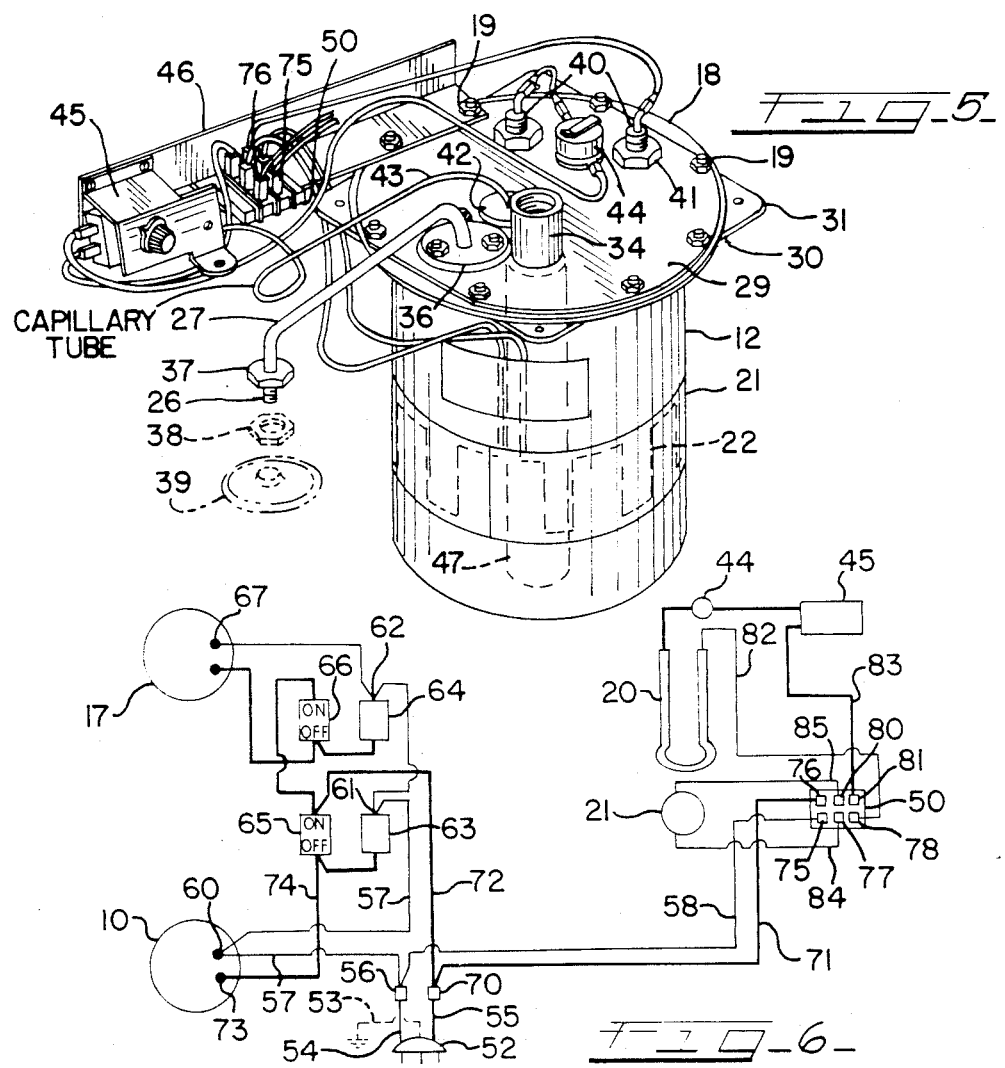

BEVERAGE BREWING APPARATUS

This invention relates generally to innovations and improvements in beverage (coffee and tea) making machines of the type wherein a supply of hot water for brewing is maintained in a hot water tank from which it is displaced by cool or cold water and then sprayed onto fresh coffee grounds or tea leaves contained in a brewing funnel lined with a filter and from which the resulting brewed coffee or tea discharges into a beaker setting on a warming plate. More specifically, the innovations and improvements reside in the ability to readily and easily remove the hot water tank and its associated mechanical and electrical components and controls as a unit for servicing and replace the same with a new or serviced unit.

Beverage making machines of the foregoing type are particularly suited for commercial (restaurant, institution and office) use. When servicing is required, in the vast majority of instances the need therefor is related to the hot water tank and its associated mechanical and electrical components. The present invention permits the hot water tank and its associated mechanical and electrical components to be readily removed for servicing and replaced with a new or serviced unit.

The object of the invention, generally stated, is the provision of a new and improved beverage making machine from which the hot water tank in which a supply of hot water is maintained and its associated mechanical and electrical components can be readily removed as a unit for servicing and replaced with another unit, such removal and replacement being readily performed by an unskilled person.

A more specific object of the invention is the provision of a coffee and tea brewing machine from which the hot water tank and its associated components can be readily removed by first removing a panel of the machine housing and then disconnecting a small number of mechanical parts and disconnecting two electrical terminals thereby freeing the hot water tank and its associated components to be removed as a unit from the housing.

For a more complete understanding of the nature and scope of the invention, reference may now be had to the following detailed description thereof taken in conjunction with the accompanying drawings, wherein:

FIG. 1 is a perspective view of a machine for brewing coffee or tea in which the present invention is embodied;

FIG. 2 is a top plan view of the coffee/tea brewer of FIG. 1 from which the cover or top panel has been removed;

FIG. 3 is a top plan view corresponding to FIG. 2 but with the cold water basin of the brewer having been removed;

FIG. 4 is a top plan view similar to FIG. 3 but from which the hot water tank and its associated components have been removed as a unit;

FIG. 5 is a perspective view of the removed unit comprising the hot water tank or reservoir and its associated components;

FIG. 6 is a wiring diagram for the brewing apparatus of FIGS. 1-5.

Referring to FIG. 1, a coffee and tea brewer is indicated generally at 5, the body of which includes a base 6, an upstanding hot water tank housing 7 and an upper housing 8.

The base 6 has a beverage beaker warmer 10 on which a beverage beaker may be supported in position to receive brewed beverage from a brewing funnel (not shown) supported underneath the overhanging portion of the upper housing 8 in known manner by funnel support rails 11—11. The apparatus 5 is of the cold water pour-in type such as shown and disclosed, for example, in U.S. Pat. No. 3,336,856 dated Aug. 22, 1967, the disclosure of which is incorporated herein by reference. In this connection, the unit 5 incorporates a hot water tank 12 (FIG. 5) and a cold water basin 13 (FIG. 2).

The upper housing 8 includes a removable cover or top panel 14 in which is located a cold water pour-in opening 15 covered by a screen 16 and a beaker warmer 17. The opening 15 and screen 16 are normally covered by a removable cover (not shown).

As is well-known, a supply of hot water is maintained in the hot water tank 12 equipped with an immersion electric resistance heater 20 (FIG. 6) of known type (e.g. a Calrod heater) with the water being maintained during intervals of non-use by means of a keep-warm blanket 21 (FIGS. 5 and 6) wrapped around the outside of the tank 12 and incorporating therein an electrical resistance conductor 22. The operating relationship between the heating element 20 and the keep-warm blanket 21 is described, for example, in U.S. Pat. No. 3,736,155 dated May 29, 1973, the disclosure of which is incorporated by reference herein.

The upper housing 8 has a floor or bottom panel 23 having a large opening 24 through which the hot water tank 12 may be lowered, a small opening 25 through which protrudes the down-turned distal discharge end 26 (FIG. 5) of a hot water discharge tube 27, and a small opening 28 for a plurality of conductors which will be referred to hereafter in connection with FIG. 6.

The hot water tank 12 has an integrally formed support flange or mounting rim 30 which is square in outline so as to provide four apertured corner formations 31—31 which are spaced so as to rest on the raised apertured portions of four corner supports 32—32 (FIGS. 3 and 4) with the respective apertures in the corner ears 31 registering with the apertures in the supports 32 so as to receive therein retaining bolt fasteners 33—33 (FIG. 3). The top opening in the tank 12 is normally closed by a cover 29 which is secured in place on the rim 30 with circular gasket 18 clamped therebetween by means of a plurality of bolts 19.

The cover 29 in addition to closing the top of the hot water tank 12 also provides support for several components, including several which are disposed on the interior of the hot water tank 12. One of the interior elements is a conventional cold water inlet tube 47 (FIG. 5) which projects downwardly into the tank 12 from the cover 29 so as to discharge cold water into the lower portion of the tank 12 in known manner. The cold water tube is supported beneath the cover 30 in communication with the lower end of nipple 34 (FIG. 5). On the upper end of nipple 34 rests the drain formation 35 (FIG. 2) in the cold water basin 13. The downwardly projecting threaded end of a bushing 9 is screwed into the nipple 34 clamping a rubber washer between the upper end of the nipple 34 and the underside of the drain 35. As is well-known, when cold water is poured into the basin 13, it drains therefrom through the cold water tube 47 and displaces hot water from the upper portion of the tank 12 through the hot water discharge tube 27.

The proximal inlet end of the hot water discharge tube 27 projects downwardly through the cover 29 into the head space in the hot water tank 12 and is supported in cantilever fashion from the cover by means of a removable support disc 36. As is well-known, the distal discharge end 26 of the hot water tube 27 is threaded and protrudes through the opening 25 in the panel 23. A hex flange or nut 37 (FIGS. 2 and 5) is rigidly secured on the end 26 above its threaded discharge end 26 so as to rest against the top side of the panel 23 at the opening 25. The threaded protruding end has a sprayhead nut 38 and sprayhead (FIG. 5) removably screwed thereon. By tightening the sprayhead nut 38 upwardly against the underside of the panel 23 the flange nut 37 is drawn down on the top side of the panel thereby releasably securing the discharge end 26 of the hot water tube 27 in place. The sprayhead 39 serves to spray the discharging hot water onto the fresh coffee or tea within a filter-lined brewing funnel.

The upper ends of the heating element 20 are threaded and protrude upwardly through the cover 29 as indicated at 40—40 and are secured in place by clamping nuts 41—41. The cover 39 also supports a disc 42 through which passes a metal thermostat capillary tube 43 having the temperature sensing lower end thereof immersed in the hot water tank 12.

Also mounted on the cover 29 is a limit thermostat 44 of known type forming part of the temperature control for the hot water within the tank 12. The regulatable hot water thermostat 45 (FIGS. 3 and 5) is mounted on the outer end of a support bracket 46 which is in the form of a right-angle member having the horizontal leg secured at a one end by a pair of the cover fasteners or bolts 19 to the cover 29. The bracket 46 also supports a terminal block 50.

The electrical system for the brewer unit 5 will now be described with particular reference to the circuit diagram shown in FIG. 6 and the various electrical connections and control elements shown in FIG. 5. Projecting from the housing of the apparatus or unit 5 is a conventional conductor cord 51 (FIGS. 1 and 6) on the end of which is the usual three-pronged plug 52 for plugging into a wall socket or other source of 120 volt alternating current (60 Hz). The conductor cord 51 provides the interior of the housing with three conductors, one being a ground 53, a second being a neutral conductor 54 and the third being a "hot" conductor 55. The neutral conductor 54 extends to a junction 56 from which branches a neutral conductor 57 and a second neutral conductor 58. The conductor 57 is connected to one of the terminals 60 of the warming plate 10 and also to terminals 61 and 62 of lower and upper switch lights 63 and 64, respectively, associated with off-on switches 65 and 66, respectively. The neutral conductor 57 terminates at the terminal 67 of a top warmer 17.

The hot conductor or wire 55 extends to a junction 70 from which it branches into hot conductors 71 and 72. The manner in which the hot conductor 72 is interconnected with the switch lights 63 and 64, switches 65 and 66 and warmers 10 and 17 is readily apparent from FIG. 6. It will be apparent that the lower warmer 10 is turned off and on by the switch 65 while the upper warmer 17 is turned off and on by the upper switch 66, the switch lights 63 and 64 glowing when these switches are in the on position.

The hot wire which extends from a terminal of the lower switch 65 to the terminal 73 of the lower warming plate 10 is indicated at 74. As will be seen from FIG. 4, the hot wires are conductors 72 and 74 and the neutral 57 extend through the opening 28 in the panel 23 of the upper housing 8. Likewise, the neutral conductor 58 and hot conductor 71 also extend through the opening 28. Neutral conductor 58 is connected to one terminal 75 of the terminal block 50 while the hot conductor 71 is connected to opposing terminal 76 thereof. The terminal block 50 also provides neutral terminals 77 and 78 which are interconnected with each other and with the terminal 75. In like manner, the terminal block 50 also provides hot terminals 80 and 81 which are interconnected with each other and with the terminal 76. The neutral terminal 78 is interconnected by conductor 82 with one of the terminals 40 of the water heater element 20. The hot terminal 81 is interconnected to the other terminal 40 of the heater element 20 by conductor 83 in series with the limiting thermostate 44 and adjustable thermostat 45.

It will be seen from FIG. 6 that if the neutral conductor 58 and hot conductor 71 are disconnected at the terminals 75 and 76, respectively, the hot water tank 12 and its electrical controls and components are completely disconnected from the incoming source of energization. For example, this disconnection can be readily accomplished as well as their reconnection by use of terminals 75 and 76 of known type havng releasable male plugs.

If it is desired to remove the cover 29 and the components carried thereby from the hot water tank, this can be readily accomplished by disconnecting the conductors 84 and 85 to the keep warm blanket 21 from the terminals 77 and 80, respectively.

A terminal block for each of the switches 65 and 66 and switch lights 63 and 64 are mounted on the interior of the upper housing 8, with the terminal block for the switch light 64 being indicated at 84 and the terminal block for the upper switch 66 being indicated at 85. The corresponding terminal blocks for the switch light 63 and switch 65 are mounted directly below the terminal blocks 84 and 85, respectively.

The operation of the beverage brewing machine 5 is conventional and well-known. Briefly, a beaker or coffee pot is placed on the warmer 10 and a brewing funnel lined with a paper filter and charged with fresh coffee or tea is inserted onto the supports 11—11 so as to be suspended over the coffee beaker or pot. The desired quantity of cold water is then poured into the cold waer basin 13 through the opening 16. As the cold water discharges or drains by gravity from the basin 13 and discharges from the cold water inlet tube 47 (FIG. 5) into the lower portion of the hot water tank 12, it displaces water upwardly and displaces hot water equal in amount to the cold water through the hot water discharge tube 27 from which it discharges through the sprayhead or nozzle 39 onto the coffee or tea. Brewing takes place in the presence of the hot water with the brewed coffee or tea discharging from the brewing funnel into the beaker or coffee pot. Also as is well-known, a second beaker or pot of coffee can be maintained in the heated condition on the upper warmer 17.

While the beverage brewing unit or machine 5 is designed and constructed so as to give prolonged and generally trouble free operation and service, a certain amount of servicing is required from time to time and this is usually associated with the hot water tank 12, one of the most frequent requirements for servicing being due to scale deposits within the hot water tank 12 and on the immersible heating element therein. Other servicing problems that can arise are connected with the thermostat control for maintaining the desired water temperature.

Heretofore, servicing of a beverage brewing unit or machine corresponding to brewer 5, and similar beverage brewing apparatus wherein a supply of hot water is maintained, has required the attention of skilled or experienced service personnel. However, the present invention allows a non-skilled and untrained person to remove the hot water tank and its related components and replace the same with a new or a repaired or rebuilt hot water tank unit. The removed hot water tank unit can then be delivered to a service center where it can be repaired and serviced by trained and skilled personnel.

The steps involved in removing and re-installing a hot water tank unit involving the hot water tank 12 and its associated components are as follows:

1. Unplug the connector plug 52.
2. Remove the top panel 14 and cold water basing 13.
3. Remove the sprayhead 39 and sprayhead nut 38 so as to free the discharge end 26 of the hot water tube 27 from the bottom panel 23 of the upper housing 8.
4. Disconnect the terminals 75 and 76.
5. Remove the tank hold-down screws 33—33.
6. Lift out the hot water tank 12 and its associated parts as shown in FIG. 5 through the top of the housing 8.

To install a new unit, the following steps should be followed:

7. Lower the new or replacement hot water tank 12 and its associated parts through the open top of the upper housing 8 while guiding the hot water tank 12 through the opening 24 and aligning the fastener-receiving apertures in the corner formations 31 with the apertures in the raised supports 32. The hold-down screws 33 are then installed and tightened.
8. The sprayhead nut 38 and sprayhead 39 are re-installed on the protruding threaded end 26 of the hot water tube 27.
9. The terminals 75 and 76 are reconnected.
10. The cold water basin 13 is re-installed and the bushing 9 screwed into the nipple 34 and tightened.
11. The hot water tank 12 is filled with water and a visible check is made for leaks around the tank cover 29 and under the cold water basin or bowl 13.
12. The thermostat 45 is adjusted as desired.
13. The top panel 14 is replaced.
14. The adapter plug 52 is plugged into an available socket.

If it is desired to separate and remove the cover 29 and the parts carried thereby from the hot water tank 12, then the conductors 84 and 85 are disconnected from the terminals 77 and 80 and the cover hold-down nuts are removed. Thereupon, the cover 29 can be lifted from the hot water tank 12 including the keep-warm blanket.

Certain changes can be made in brewer 5 without departing from the invention. Instead of having the opening 28 in the panel 23, the conductors 57, 58, 71, 72 and 74 can be brought up through the large opening 24 provided the edge thereof is smoothed or hemmed so as not to cut the insulation on the conductors.

If desired, the keep-warm blanket 21 can be omitted along with its related terminals 77 and 80 and conductors 84 and 85. When the terminals 77 and 80 are omitted, the terminal block 50 can be omitted and replaced with a polarized male-female connector of known type having one part mounted on the bracket 46 and providing terminals replacing the terminals 78 and 81 while the other part is removable and provides terminals replacing the terminals on the conductors 58 and 71. As an alternative when the keep-warm blanket 21 and terminal block 50 are omitted, the terminals 75 and 76 may be mounted on a terminal block secured to the interior of the upper housing 8 and suitable terminals can be provided on the ends of conductors 82 and 83 for mating with the relocated terminals 75 and 76.

What is claimed as new is:

1. In apparatus for brewing coffee or tea and having:
   a body which includes, a base which incorporates a beverage beaker warmer, an upstanding hot water tank housing mounted on said base, and an upper housing mounted on said upstanding housing and a portion of which overhangs said warmer and a beaker when placed thereon and having a removable housing cover;
   brewing funnel support means exteriorly mounted on the underside of said overhanging portion of said upper housing;
   a hot water tank having a removable cover and housed for the most part within said upstanding hot water tank housing and suspended therein from within said upper housing;
   a cold water inlet tube mounted on said hot water tank cover and projecting downwardly into said hot water tank;
   an electrically energized immersible heating element mounted on said hot water tank cover and projecting downwardly into said hot water tank;
   a hot water discharge tube disposed within said upper housing and mounted in cantilever fashion on said hot water tank with its proximal and hot water inlet end communicating with the upper portion of said tank and with its distal and hot water discharge end protruding from the underside of said overhanging portion of said upper housing;
   a sprayhead mounted on said protruding discharge end of said hot water discharge tube for spraying hot water into a brewing funnel when disposed on said brewing funnel support means; and
   an electrical connector cord for electrically energizing said apparatus from a power source and one end of which carries a connector plug and the other end of which extends into said body and provides a pair of electrically energizable conductors therein;
   the improvement, which comprises:
   a bracket mounted on said tank cover and disposed within said upper housing;
   a terminal block mounted on said bracket and having thereon a first pair of electrically interconnected terminals and a second pair of electrically interconnected terminals;
   a regulatable thermostat mounted on said bracket;
   water temperature sensing means extending between the interior of said hot water tank and said thermostat and passing through an opening in said tank cover;
   first conductors electrically interconnecting one of said pair of electrically energizable conductors in series with said first pair of terminals and one terminal of said water heating element; and
   second conductors electrically interconnecting the remaining one of said pair of electrically energizable conductors in series with said second pair of terminals, said thermostat, and the remaining terminal of said water heating element;

removal of said housing cover, detaching said tank cover from said upper housing, removal of said sprayhead and freeing said distal end of said hot water discharge tube from said upper housing, and disconnecting said connector means allowing said hot water tank and said bracket and thermostat mounted thereon to be removed as a unit from said body.

2. In the apparatus called for in claim 1, an electric keep-warm blanket having two terminals and surrounding said hot water tank, a pair of blanket terminals on said terminal block one of which is electrically connected with said first pair of electrically interconnected terminals and the other of which is electrically connected with said second pair of electrically interconnected terminals, and conductors electrically connecting said two terminals on said keep-warm blanket in series circuit relationship with said pair of blanket terminals on said terminal block, disconnecting said two terminals on said keep-warm blanket from said pair of blanket terminals on said terminal block allowing said tank cover together with said components mounted thereon to be removed from said tank.

3. In the apparatus called for in claim 1, said upper housing having a bottom panel which has an opening therein through which said hot water tank fits, a plurality of hot water tank supports mounted on said bottom panel around said opening therein, and support flange means on the top of said hot water tank resting on said plurality of hot water tank supports.

4. In the apparatus called for in claim 1, a cold water basin within said upper housing having a bottom drain opening releasably connected to an upstanding nipple on said hot water tank cover, and said cold water tube being connected to said nipple.

* * * * *